Nov. 2, 1943.   W. A. PARTH   2,333,488
LEASH HARNESS
Filed Sept. 17, 1942
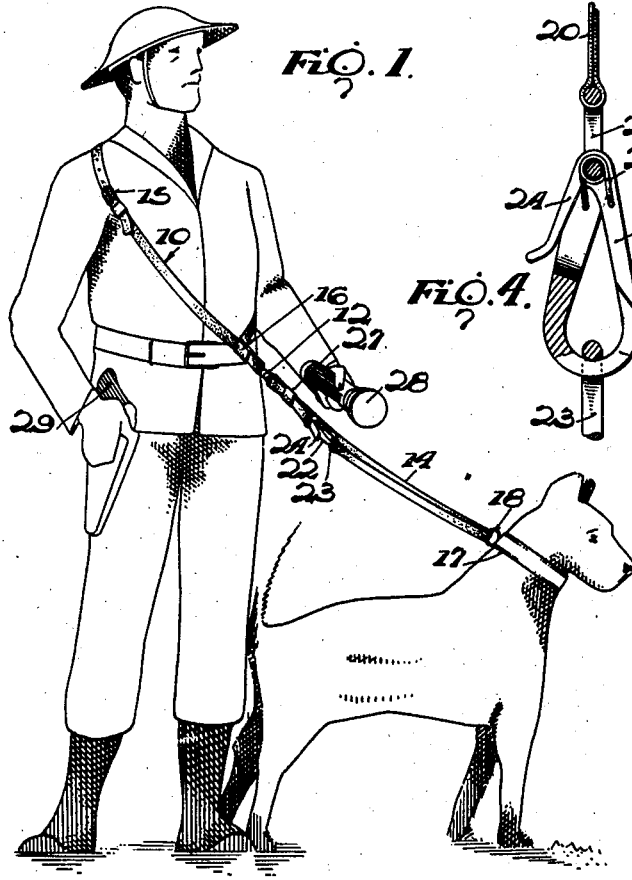
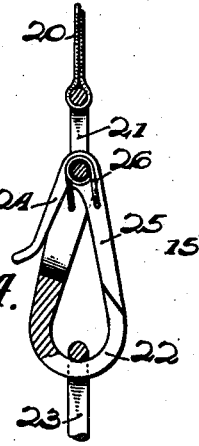
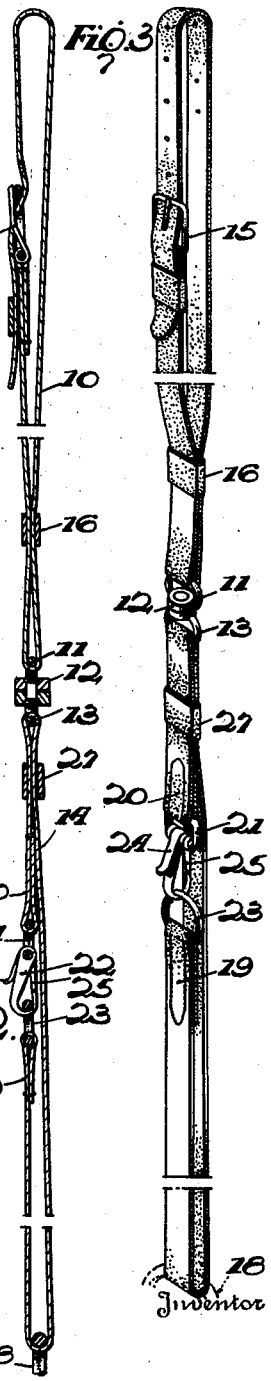
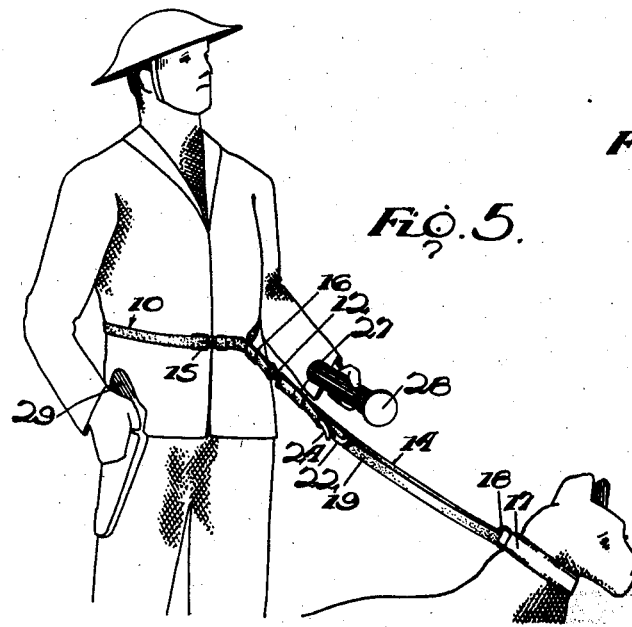
Walter A. Parth
Cameron, Kerkam & Sutton
Attorneys Patented Nov. 2, 1943

2,333,488

UNITED STATES PATENT OFFICE 2,333,488

LEASH HARNESS

Walter A. Parth, New Canaan, Conn., assignor of one-half to Richard C. Webster, Baltimore, Md.

Application September 17, 1942, Serial No. 458,749

2 Claims. (Cl. 119—109)

The present invention is an improvement in leash harness for animals and particularly dogs which are used by the Army and associated forces in sentry, scouting, patrol, Red Cross and allied work.

In the performance of such work, it is of the first order of importance that the leash be secured to the body of the soldier or attendant and in such manner as not to hamper the performance of his duties; that the soldier or attendant have both hands free for his gun and searchlight or for other objects or purposes; that the construction of leash harness be such that the dog may be released with a minimum of motion by the soldier and without bending or change of position; and that any undesired activity or antics on the part of the dog when on leash shall not tangle the harness or embarrass the soldier.

The objects of the invention are to provide a novel, simple and efficient leash harness that meets all of these various requirements.

The invention will be understood by reference to the accompanying drawing wherein Fig. 1 illustrates the leash harness applied to the dog and soldier, the belt encircling the body of the soldier passing over his right shoulder and under his left arm;

Fig. 2 is a longitudinal sectional view of the leash harness;

Fig. 3 is a perspective view of the same;

Fig. 4 is a detail of one form of catch employed; and

Fig. 5 is a view similar to Fig. 1, wherein the belt encircling the body of the soldier passes around his waist.

Referring to the drawing, wherein like reference numerals refer to like parts, 10 indicates a body strap or belt which may pass over the right shoulder and under the left arm of the soldier, as in Fig. 1, or around the waist of the soldier, as in Fig. 5. This belt passes through a metal loop 11 which is part of a swivel 12 which latter is also provided with a second loop 13 through which the dog strap or leash 14 passes. The free ends of the body strap or belt 10 are connected in any suitable manner as by a buckle 15, and the belt is adjusted to the body of the wearer by a slip ring 16 of leather or other suitable material.

The dog strap or leash 14 is preferably a single leather strap that has a slip connection with the dog collar 17 as by passing through a ring 18, the ends of the dog strap or leash being preferably looped as at 19 and 20. The loop 20 passes through a metal member 21 on a catch 22 of any suitable construction that detachably engages a metal ring 23 through which the loop 19 passes. The catch 22 is positioned to be operated by the soldier by a simple manipulation without bending or changing the position he may have assumed, in order to release the dog. A simple preferred construction of catch is shown in Fig. 4, wherein manipulation of the part 24 will move arm 25 against the tension of spring 26 to release the ring 23 on the end of the dog strap or leash 14, thus freeing the dog. The position of the catch 22 is maintained by a slip ring 27, similar to slip ring 16, through which passes that portion of the leash 14 above the catch 22, this position of the catch 22 depending upon the heighth of the dog and the heighth and arm length of the soldier. Inasmuch as the soldier or attendant should have his hands free to manipulate a searchlight 28 and his gun 29, or for other objects or purposes, catch 22 is positioned to be manipulated with a minimum of motion and without bending or change of position on the part of the shoulder or attendant.

The swivel connection 12 between the belt 10 and the dog strap or leash 14 is important, in the event the dog should indulge in undesired motions or antics to prevent tangling of the harness.

The harness of the present invention provides a simple and efficient means for maintaining the dog on leash without use of the hands of the soldier, for instantly releasing the dog for charging and other purposes and for readily putting the dog back on leash. When the dog has been released the soldier or attendant can readily tuck the free end 19 of the dog strap or leash through the belt 10.

While the invention is particularly adapted for use by soldiers and allied forces where the attendant should have his hands free, it is to be understood that the leash harness is also of utility for hunters of all sorts.

While I have herein shown and described the preferred embodiment of the inventive idea, it is to be understood that the latter is susceptible of various mechanical expressions within the limits of the appended claims.

What is claimed is:

1. A leash harness for dogs comprising a belt passing around the body of the soldier or attendent and leaving his hands free, a slip ring on the belt for adjusting said belt to the body, a strap or leash passing through the collar of the dog, a swivel connection carried by the belt and connecting said leash and belt to prevent tangling of the harness, a catch disposed intermediate the extremities of said strap or leash, a ring on said strap or leash for engagement by said catch, and means for maintaining said catch in position to be operated by the attendant to release the dog with a minimum of motion and without bending or change of position.

2. A leash harness for dogs comprising a belt passing over the right shoulder and under the right arm of the soldier or attendant and leaving his hands free, a strap or leash passing through the collar of the dog, a swivel connection carried by the belt and connecting said leash and belt and adapted to prevent tangling of the harness, a catch disposed intermediate the extremities of said strap or leash, a ring on said strap or leash for engagement by said catch, and means for maintaining said catch in position to be operated by the attendant to release the dog with a minimum of motion and without bending or change of position.

WALTER A. PARTH.